Jan. 30, 1951  A. F. DUCHESNEAU  2,539,820
SLUSH TRAP
Filed April 6, 1948
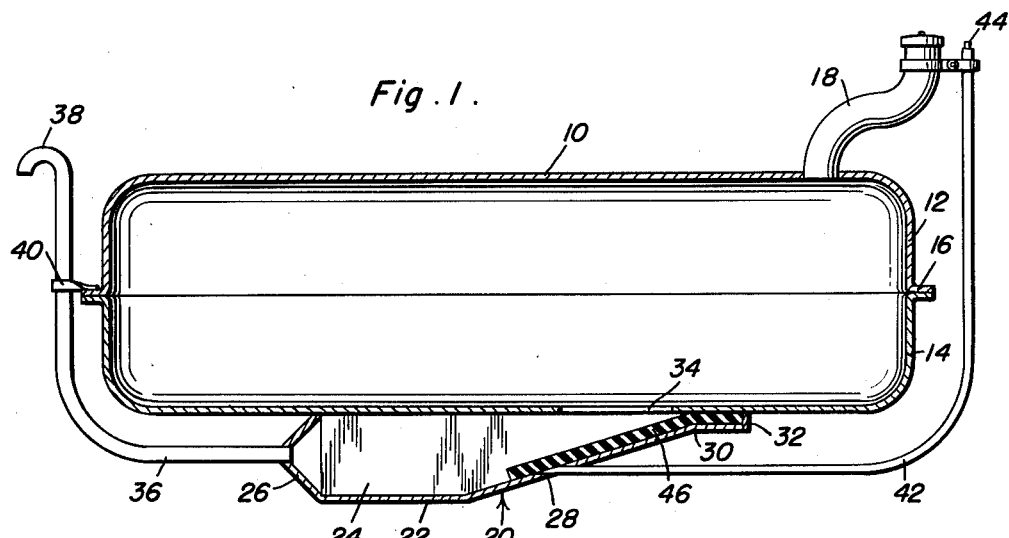
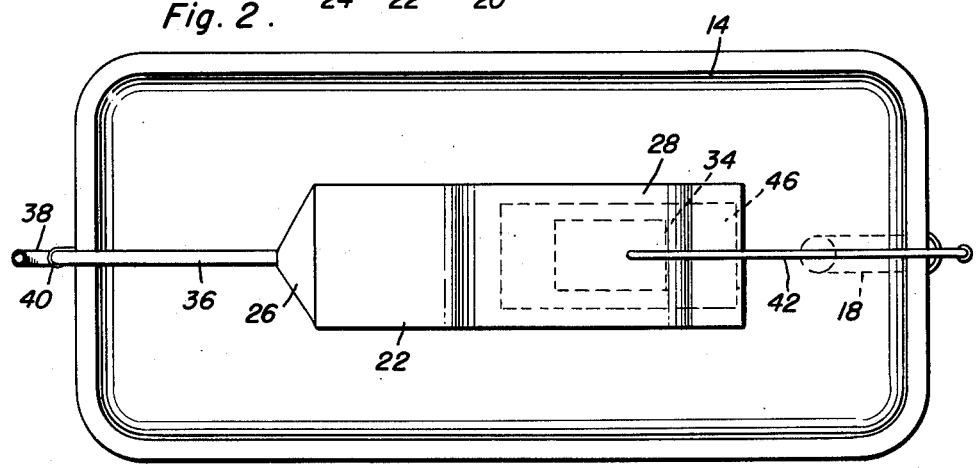
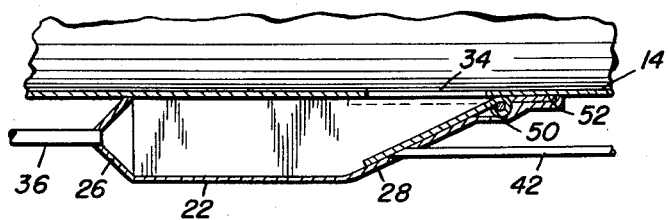
Alfred Frederic Duchesneau
INVENTOR.
BY
Attorneys Patented Jan. 30, 1951

2,539,820

UNITED STATES PATENT OFFICE 2,539,820

SLUSH TRAP

Alfred Frederic Duchesneau, Ville Lasalle, Quebec, Canada

Application April 6, 1948, Serial No. 19,239

2 Claims. (Cl. 210—57)

This invention relates to a sedimentary attachment for a liquid tank that is particularly adapted for use in association with a liquid fuel tank, such as a gasoline tank or a motor vehicle or for use with the crank case of a motor vehicle.

The primary object of this invention is to remove any sediment from the liquid in a tank, without disturbing the quantity or quality of the liquid.

Another object of this invention is to provide a sedimentary chamber in communication with a liquid fuel tank, which is adapted to receive by gravitation any sediment in the tank and to provide means in association with the chamber for forcing the sediment from the chamber, without interfering with the quality or quantity of the fuel contained in the tank.

A meritorious feature of this invention resides in the provision of a chamber secured to a liquid fuel tank and having a sediment gravitation opening between the chamber and the tank, the chamber being provided with an outlet tube and an inlet tube, whereupon air forced through the inlet tube will urge or force the sediment from the chamber through the outlet tube.

Another meritorious feature of this invention resides in the provision of a flexible valve, adapted to close off the opening between the tank and the chamber, responsive to the forcing of the sediment from the chamber, so that the liquid in the tank is prevented from leaving the tank.

Another object of this invention is to provide a sediment removing attachment for a liquid tank, which is economical to manufacture, easily and quickly attached to a conventional tank and durable and reliable in employment.

These and ancillary objects and other meritorious features are attained by this invention, a preferred embodiment of which is set forth in the following description and illustrated in the accompanying drawings, wherein:

Figure 1 is a longitudinal vertical sectional view of a conventional liquid fuel tank, illustrating in section, the sediment removing attachment, constructed in accordance with the principles of this invention, with the inlet and outlet means for the chamber and tank being shown in elevation;

Figure 2 is a bottom plan view of a combined liquid tank and sediment removing attachment, as shown in section in Figure 1; and, Figure 3 is a fragmentary sectional view of a modified form of valve closure member for shutting off any communication between the tank and the sedimentary chamber.

Referring now more particularly to the drawings, wherein similar characters of reference designate corresponding parts throughout, there is shown a conventional liquid fuel tank 10, comprising a pair of complementary longitudinal sections 12 and 14, each having a flanged lip portion 16, which are suitably joined together by welding, soldering or the like to form the unitary tank 10. A suitable filling conduit or pipe 18 is provided, for admitting the fuel into the tank.

Suitably secured to the bottom of the tank, as shown in Figure 2 of the drawings, is a sediment removing attachment, generally denoted by the character reference 20, which in association with the liquid fuel tank comprises the subject matter of this invention.

The sediment removing attachment 20 comprises a chamber 22, formed from any suitable material and of any suitable size or shape. The chamber 22 preferably comprises a casing, including a body portion 24 substantially square or circular in cross section and having a nose or front portion 26, preferably shaped in the form of a funnel with converging side walls, as seen in Figure 1 of the drawings. Rearwardly extending from the body portion 22 and slanting upwardly is a tail portion 28, which is angularly bent as at 30 adjacent the tank 10 and terminates in an angular extremity 32, which is suitably secured to the bottom of the casing, as by welding, soldering or the like.

Suitably formed at the bottom portion of the tank 10 is a sediment gravitation opening 34, which is aligned with the slanting end wall 28 of the chamber 22.

Suitably secured within the funnel shaped nose portion 26 of the casing 22 is a tubular hose or flexible pipe 36, which terminates in an angular extremity 38. Suitable means are provided to retain the hose 36, which is adapted to serve as an outlet for the chamber 24, in an inoperative placement and comprises a bracket arm 40, having one end angularly twisted and suitably secured on the flange or bead 16, with the extending portion thereof suitably formed to serve as a hook, within which the tube 36 is frictionally gripped and held.

Means is provided for forcing or urging the sediment, which gravitates from the tank 10 through the opening 34, into the chamber 24, from the chamber 24 through the outlet hose 36. The means preferably provided comprises compressed air, which is forced through the inclined end wall 28 and forces the sediment through the chamber 24 and out the outlet hose, To convey the compressed air from a suitable source, not shown, to the chamber 24 a flexible tube 42 is provided, having one end suitably inserted through an opening in the inclined wall 28, with the other end bracketed to the tank filling plate 18. Of course, a conventional pressure valve 44 is provided at the bracketed extremity of the hose 42.

Suitable means is provided, responsive to the forced air, conveyed through the tube 42 into the chamber 24, to close off the gravitation opening 34 and prevent the expelling of the liquid from the tank 10 through the outlet 36. The means preferred comprises a flexible valve plate 46, of any suitable yielding yet sturdy material, such as plastic, rubber or the like, having one end suitably inserted and retained between the tank wall of the section 14 and the angular extension of the inclined side wall 28, with the inserted end of the flexible plate 46 abutting the lateral extremity 32. The free or unattached portion of the valve plate 46 is of a substantial length and width to completely cover the opening 34 and, when in an inoperative position, as seen in Figure 1 of the drawings, the unattached extremity is adapted to seat on the inclined end wall 28 and suitably cover the air inlet opening therein.

In operation, the sediment in the tank would gravitate into the chamber 24 through the opening 34 and, when it is desired to expel the sediment therefrom, compressed air is forced through the valve 44, conducted through the tube 42 into the chamber 24. It is to be apparent that as the air enters through the opening the end wall 28, it forces the free end of the flexible valve plate 46, against the tank wall and covers the opening 34. As long as the air is being forced into the chamber 24, the valve 46 will continue to shut off the opening 34. Of course, the outlet hose 38 would be unclipped from the bracket or hook 40, the hook 40 serving to maintain the outlet tube in a raised position, so that when the sediment is not being removed, the liquid which would freely communicate with the chamber 24 would be prevented from flowing out of the chamber.

Referring now to Figure 3 of the drawings, there is shown a modified form of valve closure, which comprises a hinged free closure plate 50, suitably hinged to a secured plate 52, which is secured between the angular extremity of the inclined side wall 28 and the outer wall of the tank section 14. Of course, it is to be noted that the free or unattached plate 50 would be formed of a light metallic material or the like, which would be reactive to the air pressure from the inlet 42.

Thus, it is to be seen that there is provided a sediment removing attachment for a liquid tank, which not only provides a chamber for housing the sediment but also provides a novel structure for employing compressed air to expel or force the sediment from the chamber, with a valve opening communicating between the chamber and the tank and responsive to the air pressure.

It is to be noted that the inlet and outlet tubes 36 and 42 may be formed from a rigid material, such as, aluminum or copper pipes, and thus the need for the bracketing elements would be obviated, as the pipes would be permanently fixed in a placement, substantially as shown in Figure 1.

However, since many other purposes and objects of this invention will become apparent to those skilled in the art, upon a perusal of the foregoing description, and in view of the accompanying drawings, it is to be understood that certain changes may be effected thereon, as coming within the spirit of the invention and within the scope of the appeded claims.

Having described the invention, what is claimed as new is:

1. In combination with a liquid fuel tank a sediment removing attachment comprising a chamber secured to the bottom of the tank, the bottom of the tank being formed with a gravitation opening, a flexible outlet hose attached to one end of said chamber, a bracket secured to the tank for retaining the hose in a raised inoperative position, a forced air inlet hose attached to the opposite end of said chamber for admitting compressed air therein to force the sediment from the chamber through the outlet hose, a flexible valve carried by the bottom of said tank between the inlet and outlet openings in the chamber, said valve being normally unseated and responsive to the forced air for closing off the gravitation opening.

2. In combination with a liquid fuel tank, a sediment chamber secured to the bottom wall thereof, said bottom wall being formed with an opening communicating with the chamber, said chamber being formed with longitudinally aligned inlet and outlet openings, a flexible valve secured at one end to the bottom wall of the tank and normally having its opposite end depending into the chamber between the inlet and outlet openings, conduit means connected to the inlet opening for admitting compressed air into the chamber, said valve being closed over the bottom wall opening responsive to said air pressure.

ALFRED FREDERIC DUCHESNEAU.

REFERENCES CITED

The following references are of record in the file of this patent:

UNITED STATES PATENTS

| Number | Name | Date |
|---|---|---|
| 1,118,614 | Allen | Nov. 24, 1914 |
| 1,191,958 | Gillies | July 25, 1916 |
| 1,235,438 | Chynoweth | July 31, 1917 |
| 1,507,098 | Walker | Sept. 2, 1924 |
| 1,518,686 | Bland | Dec. 9, 1924 |
| 1,828,040 | Hahm | Oct. 20, 1931 |

FOREIGN PATENTS

| Number | Country | Date |
|---|---|---|
| 228,833 | Germany | Nov. 23, 1910 |
| 600,715 | France | Nov. 14, 1925 |